United States Patent [19]

Falke et al.

[11] Patent Number: 4,613,069

[45] Date of Patent: Sep. 23, 1986

[54] METHOD FOR SOLDERING ALUMINUM AND MAGNESIUM

[75] Inventors: Wilbert L. Falke, St. James; Agnes Y. Lee; Leander A. Neumeier, both of Rolla, all of Mo.

[73] Assignee: The United States of America as represented by the Secretary of the Interior, Washington, D.C.

[21] Appl. No.: 568,767

[22] Filed: Jan. 6, 1984

Related U.S. Application Data

[63] Continuation-in-part of Ser. No. 324,173, Nov. 23, 1981, abandoned.

[51] Int. Cl.$^4$ ............................................. B23K 1/02
[52] U.S. Cl. ................................. 228/211; 228/208; 228/263.17

[58] Field of Search ................................. 228/208–211, 228/263.17

[56] References Cited

U.S. PATENT DOCUMENTS

| | | | |
|---|---|---|---|
| 4,341,816 | 7/1982 | Lauterbach | 228/208 |
| 4,352,450 | 10/1982 | Edgington | 228/208 |
| 4,407,441 | 10/1983 | Aarts | 228/263.17 |
| 4,463,060 | 7/1984 | Updegraff | 228/211 |
| 4,516,715 | 5/1985 | Sugimori | 228/208 |

*Primary Examiner*—Nicholas P. Godici
*Assistant Examiner*—Kurt Rowan
*Attorney, Agent, or Firm*—E. Philip Koltos; Thomas Zack

[57] ABSTRACT

Aluminum, magnesium, or their alloys are soldered by means of a tin-lead system following initial application of a thin coating of nickel-copper alloy.

7 Claims, No Drawings

METHOD FOR SOLDERING ALUMINUM AND MAGNESIUM

This application is a continuation-in-part of pending application Ser. No. 324,173, filed Nov. 23, 1981, now abandoned.

This invention relates to a process for soldering aluminum or magnesium, or their alloys, comprising initially applying a thin nickel-cooper alloy coating, followed by soldering with conventional tin-lead soldering systems (solders and fluxes). With conventional technology, it is virtually impossible to perform soldering operations on aluminum, magnesium, and other reactive metals using conventional tin-lead soldering systems because of lack of wetting and spreading of the solders on the substrates. The same is true for alloys of aluminum and magnesium. No practical commercial soft soldering of aluminum and its alloys or magnesium and its alloys is known using standard tin-lead solders and conventional resin or chloride fluxes. Presently, fixtures fabricated from these materials are joined by special techniques which are complex and/or expensive; after fabrication, when breakage occurs, no readily applied solder system is available for their repair, commonly resulting in scrapping of the fixtures. A system of fabrication or repair which will allow the use of conventional tin-lead "soft" soldering systems can have major industrial impact, especially for the aluminum industry because of its size and the multitude of uses of aluminum and its alloys.

For a soft soldering system to be practical and useful, the tin-lead solders for conventional compositions must readily wet and spread on the substrate, preferably using conventional fluxes. The wetting and spreading should be to an extent and degree equivalent to that of the same solders and fluxes applied to copper or brass. The wetting and spreading should be consistent and reproducible. The solder must form a strong bond at the solder-substrate interface, and the bonding must be stable over long periods of time and not subject to excessive corrosive degradation resulting in embrittling and separation of the solder from the substrate when even moderate stress is applied to the solder-substrate interface.

The present invention represents a significant and unique advancement over the current state of the art for soldering of aluminum or magnesium and their alloys. The following description and discussion specifically explains the unique advancement which makes practical for the first time the soft soldering of such substrates to consistently form strong and stable joints using a wide variety of conventional tin-lead solder systems (solder plus flux).

In the current art, it is known that aluminum and its alloys are very difficult to solder. The American Society for Metals, Metals Handbook, Ninth Edition, v. 6, 1983, p. 1075, (1) states that . . . "Aluminum forms a tenacious oxide layer upon exposure to air and is therefore difficult to solder. These oxide films interfere with soldering [wetting and spreading] unless particularly aggressive cleaning and fluxing actions are used, perhaps with a special solder composition as well . . . ." The fluxing employed is therefore particularly agressive and corrosive, and solder compositions other than the conventional tin-lead systems may be required. In addition, it has been shown that joints so formed are generally unstable and short lived and of little or no practical value. This is believed due to the fact that tin-lead solders do not to any extent form interfacial compounds with aluminum or magnesium, in contrast to the formation of such compounds when tin-lead solders are used on copper or brass substrates. Furthermore, tin-lead alloy in contact with aluminum (or magnesium) sets up a galvanic cell action at the interface, the corrosion products of which destroy any bonding in a relatively short period, so that the solder peels or cracks off the aluminum even when little or no stress is applied. Aggressive corrosive fluxes characteristically are difficult to wash off or remove and this compounds the rate and extent of the corrosive action.

Metallic coating of metals and alloys has been used to some extent to improve the solderability of the metals and alloys. With appropriate pretreatment procedures such as cleaning (mechanical, chemical, electroetching), and zincating, it has been known that metals such as copper and nickel can be plated onto aluminum and its alloys. Copper coatings have been indicated to afford some improvement to the solderability of aluminum but the results have been inconsistent. Thin coatings of copper on aluminum, of about 10 micrometers or less, will cause tin-lead solder to wet aluminum at appropriate soldering temperatures, but then will readily de-wet by solubilizing in the tin-lead alloy. The solder's ability to spread and form a useful joint is thereby lost. The application of thicker copper coatings can retard this tendency for de-wetting of tin-lead solder on aluminum. However, applications of thicker copper coatings are time consuming, and good solder joints do not result because the copper and aluminum tend to separate or "flake" at their interface juncture. This separation of the relatively thicker copper from the aluminum substrate is believed to be due at least in part to the different thermal expansion coefficients of copper, aluminum, and copper-tin compounds that form at the solder-copper interface.

For nickel coatings of about 1 to 10 micrometers thickness, tin-lead solders have shown limited wetting and spreading onto the nickel coating when using chloride fluxes. Rosin fluxes do not work well when soft soldering nickel. The de-wetting noted with copper coatings of this thickness range has not been noted; however, the spreadability of the tin-lead solders on the nickel is very limited, as illustrated below. In addition, electrolytic nickel coatings are characteristically somewhat porous and are subject to micro-cracking which increases tendency for contact between the solder and aluminum substrate with the concommitant danger of corrosive joint degradation.

It has now been found, according to the process of the invention, that aluminum, magnesium and their alloys may be soldered by conventional methods, provided that a thin layer or coating of nickel-copper alloy is first applied to the aluminum or magnesium substrate. It is essential that the coating be in the form of a nickel-copper alloy since neither nickel nor copper alone results in proper wetting and spreading of the subsequently applied tin-lead solder. The nickel-copper alloy coatings of the invention, however, result in excellent wetting and spreading of the tin-lead solder in the coated area. The coatings are non-porous and free of microcracking, controllable as to composition and thickness, and tightly bonded to the prepared aluminum or magnesium substrates. The joints so formed have strengths equivalent to those formed conventionally between copper or brass components (uncoated) using the same conventional and standard tin-lead solders and fluxes. The wetting and spreading are as rapid as those for conventional tin-lead soldering of copper and brass, facilitating practical commercial soldering rates. The joints so formed have also been shown to be very stable with time, retaining ductility and lack of corrosive degradation.

For best results, the coating should consist of a dense, fine-grained, adherent layer of suitable thickness. Although alternate means may be employed for formation of the coating, the preferred means is that disclosed in U.S. Pat. No. 4,167,459, the disclosure of which is incorporated herein by reference. This procedure involves electrodeposition of the nickel-copper alloy from aqueous solution, preferably on a substrate consisting of zincated aluminum, magnesium or alloys thereof. Zincating, the electroless application of a very thin layer of zinc on a metallic substrate, is conventional technology for alloy preparation for electroplating.

Coating of the substrate is carried out by electroplating the nickel-copper alloy from acetate solution onto the properly cleaned and zincated substrate material to be soldered. The cleaning can be by mechanical methods such as sand or shot blasting, peening, abrading, buffing, etc. and/or chemical etching, with the only requirement being that the surface is cleaned to an extent permitting one or more applications of a thin zincated subcoating (layer of zinc). The zincated layer, typically of about 0.02 to 0.04 micrometer thickness, is formed by chemical means such as immersing the substrate or brushing the electroless alkaline zincate solution onto the properly cleaned substrate surface. The zincating, and subsequent nickel-copper coating, can be applied to aluminum or magnesium, or to their alloys made by adding elements such as silicon, copper, zinc, manganese, chromium, or titanium, and including alloying magnesium in aluminum or aluminum in magnesium.

The electroplating solution consists essentially of an aqueous solution of acetates of nickel and copper, to which is preferably added boric acid in an amount of about 5 to 40 grams per liter for the purpose of buffering the electrolyte. Other buffering or wetting agents may also be desirable for specific applications. Optimum concentrations of the nickel and copper acetates may vary considerably with the desired composition of the nickel-copper deposit. However, a concentration of nickel acetate of about 50 to 150 grams per liter and of copper acetate of about 3 to 25 grams per liter is generally satisfactory. Best results are obtained with the pH of the electrolyte being in the range of about 5.0 to 7.0 and the operating temperature of the electrolyte being about 20° to 40° C.

The electroplating procedure may be conducted by using either a conventional electrolytic cell or the brush-coating technique. The components of the electroplating process include the cathode, the anode, and the aqueous acetate electrolyte. In both methods of plating, the substrate metal or alloy serves as the cathode. The anode may consist of nickel, copper, nickel-copper alloy, or other conductive material. For the electrolytic cell technique, the anodes may be of any conventional form such as rods, sheets, screens, etc. For the brush-coating technique, especially useful for limiting substrate area to be coated and facilitating repair operations, the anode is usually in the form of a rod, plate, or other configuration suitable for reaching the area to be coated, with the end wrapped with an absorbent material such as cotton or gauze. The wrapped end of the anode is dipped into the electrolyte to absorb solution and is then brushed onto the zincated substrate (cathode) to be plated, while applying controlled voltage and amperage for an adequate period to effect plating of the desired nickel-copper alloy coating.

Optimum current densities differ for applying the nickel-copper alloy coating in an electrolytic cell bath and by the brush-coating technique. For the electrolytic bath, current densities ranging from about 15 to 35 mA/cm$^2$ have given the best results, whereas for brush-coating, current densities of about 100 to 300 mA/cm$^2$ (based on anode-substrate contact area) have led to the best results. Variations can be expected with differing cell and stylus configurations. The period of electrodeposition is variable and depends on factors such as the area to be coated, the method of coating, and nickel-copper ratio, and the deposit thickness, in addition to the current density.

In general, the percentage of nickel in the alloy deposit has been found to increase with increasing current density. Although lower and higher nickel contents, from less than 5 pct to about 90 pct, can be deposited in the nickel-copper alloy coatings, a range of about 30 to 75 pct Ni has been found to produce the best solder joints from the standpoint of wetting or de-wetting and net spreadability of the subsequently applied tin-lead solders. Other factors constant, the thickness of the deposited nickel-copper coating is a function of the period of electrodeposition. The coating thickness formed must be sufficient to maintain the desired solderability during the subsequent tin-lead soldering heat application. The thickness required will vary according to factors such as the specific soldering technique and temperature, and the size and shape of the materials being soldered. A thickness of about 0.5 to 12 micrometers has been found to be satisfactory for a number of solder joints, with a range of about 1 to 3 micrometers being preferred. Thicker nickel-copper alloy coatings generally work well, although they are not as conservative of nickel and copper.

The nickel-copper-coated reactive substrates such as aluminum, aluminum alloys, magnesium, and magnesium alloys can then be soldered to one another in a customary manner using conventional tin-lead solders and fluxing media. The coated materials can also be joined by tin-lead soldering to other metals and alloys which can normally be joined by soldering with tin-lead soldering systems without need for the nickel-copper coatings. For example, nickel-copper coated aluminum or aluminum alloys can be readily joined to uncoated copper or brass using conventional tin-lead soldering systems.

The tin-lead soldering procedure is conventional and comprises application of molten tin-lead alloy solder, containing commonly about 5 to 70 percent by weight of tin, to the substrate areas to be soldered. When the tin-lead "soft" solders are used following application of the nickel-copper alloy coating to aluminum or magnesium and their alloys, spreadabilities of the tin-lead solders become generally equivalent to those obtained with the same tin-lead solders conventionally applied to copper and brass substrates, and resultant strengths of the solder joints become equivalent to those obtained for copper and brass substrates soldered with the same tin-lead systems. Solders of higher tin may also be used, although their spread is somewhat less than the spread of tin-lead alloys of lower tin content. Similarly, tin-lead solders containing silver will spread on the nickel-copper coatings as well as on copper or brass.

Because aluminum or magnesium oxide surface formation on aluminum and magnesium substrates is what makes the respective alloys non-solderable with tin-lead solders in a practical sense, the problem is most acute for the pure metals and their lean alloys relative to their alloys of higher alloy content. Nonetheless, any of their respective alloys that spontaneously form surface oxides of aluminum or magnesium suffer from non-wetting of tin-lead solders or the problems of using aggressive and corrosive fluxes, and require the nickel-copper alloy coatings of the methods of the invention to be rendered solderable.

The invention, and its advantages, will be more specifically illustrated by the following examples.

EXAMPLE 1

Aluminum (Aluminum Assoc. (AA) designation No. 1100=0.12 pct Cu, 99.00 pct Al minimum) substrate pieces, one 1½ by 1½ by ⅛ inch thick and the other a 1½-inch length of a ⅜-inch diameter rod, were coated with nickel-copper alloy and soldered with a tin-lead solder using the following procedure:

The aluminum pieces to be joined were first chemically etched to clean the surfaces and were then given an electroless zincate treatment to deposit a thin layer of zinc. The zincated solution was applied to the substrates with disposable cotton swabs.

A nickel-copper alloy coating was then applied to the aluminum substrate areas to be soldered by use of electrolytic brush-coating. Five to 10 milliliters of the electrolyte, consisting of 125 grams per liter of nickel acetate, 10 grams per liter of copper acetate, and 5 grams per liter of boric acid, were used to coat the substrate areas. The applicator used consisted of an anode made from a 70 pct nickel-30 pct copper rod, which was wrapped with a layer of gauze over cotton at the electrolyte application end. The brush-coating was conducted at a current density of approximately 200 milliamps per square centimeter (based on contact area between anode stylus and Ni-Cu alloy coating), over an interval of approximately 2 minutes. This treatment resulted in electrodeposition of a nickel-copper alloy coating layer, containing between 50 and 60 pct nickel, on the substrate. The thickness was approximately 2 micrometers ($1.6 \times 10^{-4}$ inch).

The nickel-copper coated aluminum substrates were then joined by soldering with a 60 pct lead-40 pct tin solder using a conventional rosin-type flux and conventional procedures. The strength of the solder joints thus prepared was equivalent to the strengths resulting when soldering similar size rod-to-plate joints of copper-to-copper and brass-to-brass substrates using the same solder, flux, and conventional procedure (without nickel-copper alloy coating).

EXAMPLE 2

Aluminum (AA No. 1100) substrate pieces similar to those of Example 1 were pretreated to clean the surface and were zincated by dipping the pieces directly in the zincate solution, masking off the areas not to be coated and soldered. The nickel-copper alloy coating in this instance, however, was applied to the areas to be soldered by use of an electrolytic cell bath instead of brush-coating. The electrolyte composition was the same as in Example 1. The coating was applied at a current density of 30 milliamps per square centimeter over a period of 5 minutes. The resulting nickel-copper alloy coating composition was 60 to 70 pct nickel and the thickness was approximately the same as for Example 1. Again, the strength of the 60 pct lead-40 pct tin solder joints prepared as described in Example 1 was equivalent to strengths of rod-to-plate solder joints of copper-to-copper and brass-to-brass prepared with the same solder and flux according to conventional procedures. In addition, placing of such solder speads on the aluminum sheet into a humidity chamber at 100 pct humidity at 60° C. for a period of 52 weeks resulted in no evident corrosive degradation to the joints. Aluminum sheet specimens coated with nickel-copper alloy and tin-lead-soldered could be bent to between 90° and 180° after storage in the humidity chamber for 52 weeks with no evidence of cracking of the solder or any tendency of separation of the solder from the coated aluminum substrate.

EXAMPLE 3

Aluminum alloy AA No. 2024 (4.4 pct Cu, 0.8 pct Mn, 1.5 pct Mg, 93.5 pct Al minimum) substrate pieces ⅛-inch thick by ⅜-inch wide were pretreated to clean the surface and were zincated similar to Example 2 by dipping the pieces in the zincate solution, masking off the areas not to be coated and soldered. The nickel-copper alloy coating was applied to the areas to be soldered by use of an electrolytic cell bath. The electrolyte was the same composition as described in Example 1. The coating was applied at a current density of 20 milliamps per square centimeter over a period of approximately 120 seconds. The resulting nickel-copper alloy coating composition was approximately 45 to 55 pct nickel and the thickness was approximately 0.6 micrometer. The strength of the 50 pct lead-50 pct tin solder joints prepared by forming shear-tensile lap joint specimens (⅜-inch soldered overlap) using rosin-type flux was equivalent to strength of similar plate-to-plate solder lap joints of copper-to-copper and brass-to-brass prepared with the same solder and flux according to conventional procedures. The same result occurred when the specimens were prepared in the same manner except that deposition was continued until the thickness of the nickel-copper coating was approximately 2 micrometers. Humidity chamber testing of these joints as described in Example 2 also produced equivalent results of no cracking of the tin-lead solder after exposure for 100 days at 100 pct humidity and 60° C. and no separation of the solder from the aluminum substrate when bending the aluminum sheet between 90° and 180°.

EXAMPLE 4

Similar strength resulted for lap joint specimens prepared as described in Example 3, except that the approximately 2-micrometer thick nickel-copper coating of 45 to 55 pct Ni was applied by brush plating at approximately 200 millilamps per square centimeter for 45 seconds, rather than by cell plating. Such lap joint specimens also exhibited strengths equivalent to lap joints of similar configuration prepared with the same tin-lead solder and flux according to conventional procedures.

EXAMPLE 5

Aluminum substrate pieces similar to those of Example 3 were cleaned and zincated in the same manner. The nickel-copper alloy coating was applied to the areas to be soldered by use of an electrolytic cell bath. The electrolyte was the same composition as described in Example 1. The coating was applied at a current density of 20 milliamps per square centimeter over a period of 45 minutes. The resulting nickel-copper alloy coating composition was approximately 45 to 55 pct nickel and the thickness was approximately 12 micrometers. The strength of the 50 pct lead-50 pct tin solder joints prepared as described in Example 3 was equivalent to the strengths of similar plate-to-plate lap joints of copper-to-copper and brass-to-brass prepared with the same solder and flux according to conventional procedures.

EXAMPLE 6

The strength of solder joints prepared in the same manner as in Example 3 on nickel-copper alloy coating approximately 2 micrometers thick, but using a conventional zinc-ammonium-chloride acid-type flux, was again equivalent to the strengths of joints of copper-to-copper and brass-to-brass prepared with the same solder and flux according to conventional procedures.

EXAMPLE 7

The strengths of solder joints prepared in the same manner as in Example 3 on nickel-copper alloy coating approximately 2 micrometers thick, but using a 70 pct tin-30 pct lead solder, a 5 pct tin-95 pct lead solder, or a 62 pct tin-36 pct lead-2 pct silver solder, were equivalent to the strengths of joints of copper-to-copper and brass-to-brass joints prepared with the same respective solders and flux according to conventional procedures.

EXAMPLE 8

The strengths of solder joints prepared in the same manner as in Example 3 on nickel-copper alloy coating approximately 2 micrometers thick, but using a special aluminum-1.5 pct magnesium-9.8 pct silicon alloy as the sheet substrate (1 by 3 by 3/32 inch thick), were also equivalent to the strengths of joints prepared in the same manner as in Example 3, and equivalent to the strength of copper-to-copper and brass-to-brass joints prepared with the same solder and flux according to conventional procedures. Similar good strengths resulted when the nickel-copper alloy coated substrate was aluminum alloy AA No. 3003 (0.12 pct Cu, 1.2 pct Mn, 98.6 pct Al minimum).

EXAMPLE 9

Sheet specimens (1/16-inch thick) of a magnesium-base alloy, AZ31B (3 pct aluminum, 1 pct zinc, balance magnesium), were chemically cleaned, were zincated, and were given a copper strike (electroless) in a manner similar to conventional preparation for nickel plating. After the copper strike, however, (to retard reaction of magnesium with the acetate electrolyte), a nickel-copper alloy coating of 45 to 55 pct nickel was applied with the same electrolyte composition as in Example 1 and in the same manner as described in Example 3. The thickness of the nickel-copper alloy coating was approximately 1 micrometer. The strength of the 50 pct tin-50 pct lead overlap solder joints was equivalent to the strengths of lap joint specimens of copper-to-copper and brass-to-brass prepared with the same solder and flux according to conventional procedures.

EXAMPLE 10

Aluminum (AA No. 1100) sheet specimens (1/16-inch thick) were soldered with 50 pct tin-50 pct lead solder, and a highly aggressive chloride-fluoride flux was applied in a manner similar to that described in the ASM Metals Handbook, Ninth Edition, v. 6, "Welding, Brazing, and Soldering", 1983, p. 1075. The spread areas were erratic but were sometimes similar to those occuring when soldering copper with the same solder and conventional rosin-type flux, or nickel-copper coated aluminum according to the process of the invention. However, the solder-aluminum junctures were shown to be of little practical value. After dwelling in a humidity chamber at 100 pct relative humidity and 60° C. for 1 week or less, the solder cracked when the aluminum was bent only a few degrees and the solder separated from the aluminum, attributed to galvanic corrosion product formation at the aluminum-solder interface.

EXAMPLE 11

Cleaned and zincated aluminum (AA No. 1100) was electrolytically cell coated from copper sulfate solution with copper approximately 5 to 6 micrometers thick and attempts were made to 50 pct tin-50 pct lead solder using rosin-type flux. The solder wet and spread on the substrate and then immediately de-wet from copper solubility in the tin-lead solder, rendering the solder area of no use. Repeating the procedure but lengthening the deposition period to produce a copper coating of approximately 10 to 12 micrometers resulted in little tendency to de-wet after initial wetting and spreading. However, again the solder area was of little practical use relative to nickel-copper alloy coating and soldering because the copper cracked and flaked off of the aluminum at the greater thickness. Duplicate trials sometimes produced better strengths when the copper adhered but the results were erratic. The inconsistent bonding of the copper to the aluminum is believed to be related to substantially differing thermal expansion coefficients of aluminum and copper.

EXAMPLE 12

Cleaned and zincated aluminum (AA No. 1100) was electrolytically cell coated from nickel sulfate electrolyte to produce a nickel coating of approximately 1 to 2 micrometer thickness. Attempts were made to spread 50 pct tin-50 pct lead solder onto the nickel-coated substrate using rosin-type flux. The solder wet and spread to a limited extent on the nickel. The tendency to de-wet, evident for copper coatings of similar thickness, was not noted. However, the spreadability in repeated measurements was shown to be only 20 to 40 pct the spreadability of the same solder and flux on nickel-copper coated aluminum. This was confirmed numerous times. Therefore, lap joints prepared similar to Example 3 were significantly weaker than the joints made using nickel-copper alloy coatings, because the solder did not spread adequately and fill the joint contact area. The only way to get additional spread of the solder on the nickel and additional strength of the joint was to significantly extend the duration of the soldering. Even then, joints equivalent to the use of nickel-copper alloy did not form. Tests also showed that the nickel coatings were characteristically porous whereas the nickel-copper alloy coatings applied from the acetate electrolyte were not.

EXAMPLE 13

Attempts were made to solder sheet specimens of magnesium-base alloy AZ31B in the same manner as described in Example 9, except that the pretreatments and application of the nickel-copper alloy coating were not employed. The solder would not wet and spread on the AZ31B alloy substrate even with the use of the aggressive chloride-fluoride flux.

We claim:

1. A process for soldering aluminum, magnesium, or their alloys, comprising initially applying thereto a thin coating consisting essentially of nickel-copper alloy, and subsequently soldering the coated metal by means of a tin-lead solder system.

2. The process of claim 1 in which the surface of the aluminum, magnesium, or alloy thereof, is zincated prior to application of the nickel-copper alloy coating.

3. The process of claim 1 in which the nickel-copper alloy coating is applied by electrodeposition from an acetate solution.

4. The process of claim 3 in which the nickel-copper alloy coating is applied by brush-coating electrodeposition.

5. The process of claim 1 in which the nickel content of the nickel-copper alloy coating is between about 30 and 75 pct.

6. The process of claim 1 in which the thickness of the nickel-copper alloy coating is about 0.5 to 12 micrometers.

7. The process of claim 6 in which the thickness of the nickel-copper alloy coating is about 1 to 3 micrometers.

* * * * *